Sept. 10, 1963  E. CHOSY  3,103,350
THROUGH-AXLE SPRING INSTALLATION
Filed Aug. 25, 1961
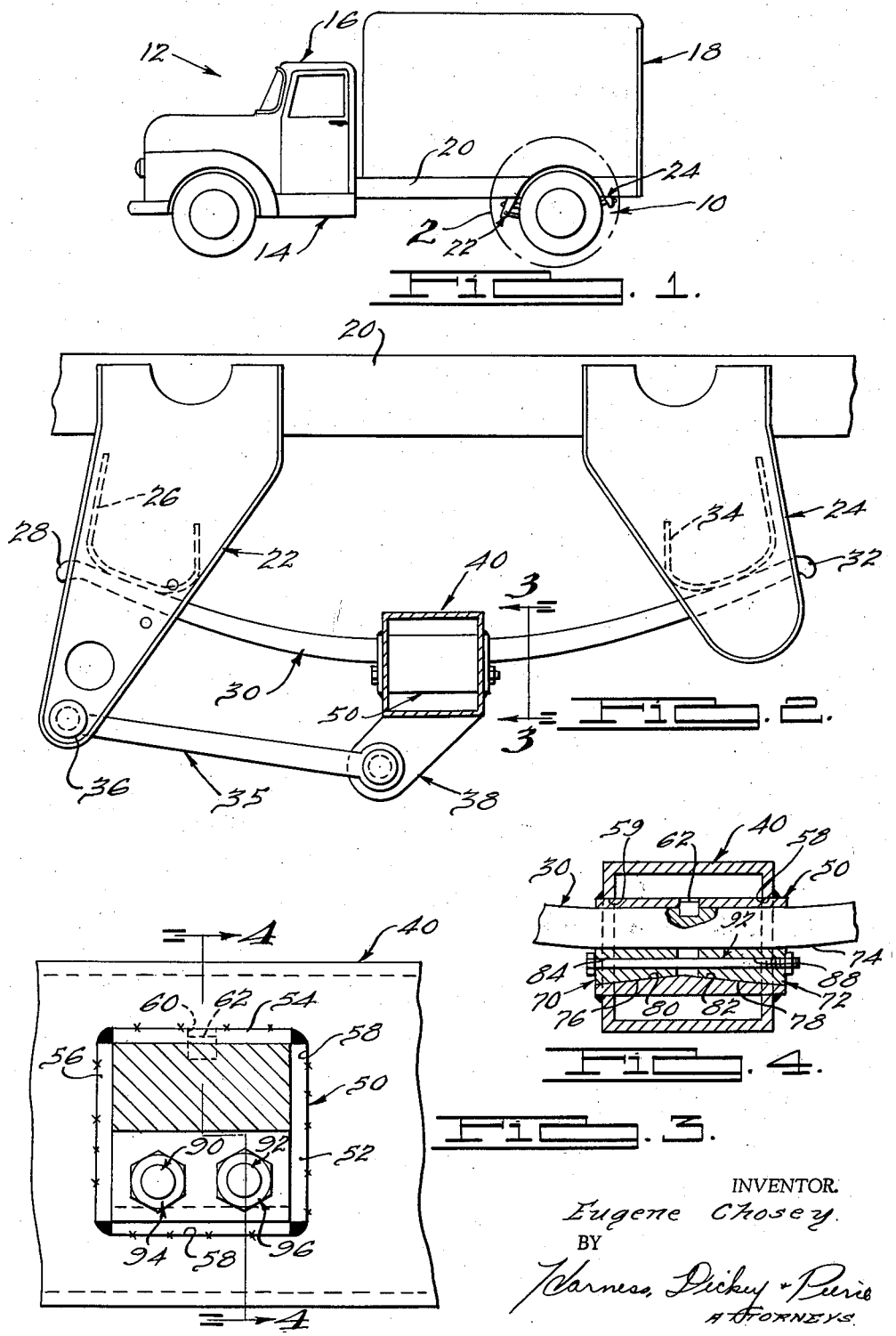
INVENTOR.
Eugene Chosey.
BY
Harness, Dickey & Pierce
ATTORNEYS

United States Patent Office 3,103,350
Patented Sept. 10, 1963

3,103,350
THROUGH-AXLE SPRING INSTALLATION
Eugene Chosy, Grosse Pointe Farms, Mich., assignor to Fruehauf Trailer Company, Detroit, Mich., a corporation of Michigan
Filed Aug. 25, 1961, Ser. No. 133,922
1 Claim. (Cl. 267—52)

This invention relates generally to vehicle suspension systems and more particularly to a novel through-axle spring installation.

Characteristically, the suspension system of a vehicle comprises one or more springs that extend between a wheel-supporting axle and the frame of the motor vehicle. The springs are generally secured either above or below the axle by means of, for example, U-bolts.

The present invention is directed to an improved means of securing a spring to such a wheel-supporting axle. In accordance with the present invention, the axle-supporting springs are supported in a box-like housing extending transversely through and generally centrally of the wheel-supporting axle. The housing contains suitable wedge blocks that are advanceable to firmly and rigidly secure the spring with respect to the transverse housing. Thus, a relatively large mechanical advantage can be obtained from the spring mounting to hold the spring within the housing. Springs mounted in this manner are thus precluded from rotation with respect to the axle. Also, the mounting is relatively simple and inexpensive, and the spring is readily mounted and removed from the axle for servicing without requiring the removal of any other part.

Accordingly, one object of the present invention is an improved through-axle spring mounting.

Another object is a through-axle spring mounting wherein the spring is supported within a transversely extending housing.

Another object is a through-axle spring mounting wherein the holding means of the mounting has a relatively large mechanical advantage.

Other objects and advantages of the instant invention will be aparent in the following detailed description, claim and drawings wherein:

FIGURE 1 is a side elevational view of a van-type truck;

FIG. 2 is a fragmentary cross-sectional view taken within the circle 2 of FIGURE 1 with a wheel removed from the axle;

FIG. 3 is a cross-sectional view taken substantially along the line 3—3 of FIG. 2; and FIG. 4 is a cross-sectional view taken substantially along the line 4—4 of FIG. 3.

Referring now to the drawings, an improved through-axle spring installation 10 is shown operatively associated with a van-type vehicle 12. It is to be understood that the spring installation hereinafter discussed in detail is applicable to vehicles other than the vehicle 12 which is exemplary in nature. The vehicle 12 comprises a chassis 14 having a cab 16 and a conventional van-type body 18. As best seen in FIG. 2, a frame portion 20 of the chassis 14 is provided with a pair of conventional downwardly depending hangers 22 and 24 on opposite sides thereof. It is to be understood that the pairs of hangers 22 and 24 on opposite sides of the chassis 14 are similar in construction, only one pair of hangers 22 and 24 being hereinafter described for the purpose of clarity.

The forward hanger 22 has a spring support 26 secured thereto, as by welding, for engagement with an end portion 28 of, for example, a beam spring 30. An opposite end portion 32 of the spring 30 is normally engaged with a rear spring support 34 that is secured to the hanger 24, as by welding. A radius rod 35 is pivotally secured to and extends between a lower end portion 36 of the front hanger 22 and a downwardly depending bracket 38 on an axle 40.

The axle 40, in an exemplary constructed embodiment of the instant invention, is of box-like tubular cross section and extends laterally of the chassis 14 for the support of a pair of road contacting wheels in the conventional manner.

In accordance with the present invention, the spring 30 is fixedly secured within a tubular housing 50 that extends transversely of the axle 40. The housing 50 comprises a plurality of plate portions 52, 54, 56 and 58 that extend laterally of the axle 40 within laterally aligned apertures 58 and 59 therein. The plates 52, 54, 56 and 58 are secured to each other and within the apertures 58 and 59, as by welding.

The upper plate portion 54 of the housing 50 is provided with an aperture 60 for the acceptance of a complementary pin 62 on the spring 30. Upon engagement of the pin 62 within the aperture 60, the spring 30 is positively positioned longitudinally of the housing 50.

The spring 30 is positioned and retained against the upper plate 54 of the housing 50 as by a pair of wedge blocks 70 and 72 that are engageable with a lower surface 74 of the spring 30 and have inclined faces 76 and 78, respectively, that are engageable with complementary inclined faces 80 and 82 on the lower plate 58 of the housing 50.

The wedge blocks 70 and 72 have apertures 84 and 88 therein, respectively, for the acceptance of a pair of bolts 90 and 92. Thus, upon advancement of conventional nuts 94 and 96 longitudinally of the bolts 90 and 92, respectively, the wedge blocks 70 and 72 are advanced toward one another, the inclined surfaces 76 and 78 thereof moving up the complementary inclined surfaces 80 and 82 on the lower plate 58 thereby biasing the beam spring 30 upwardly against the upper plate 54 to rigidly lock the beam spring 30 with respect to the housing 50 and axle 40. In this manner, the spring 30 is affixed to the axle 40 by simply tightening the nuts 94 and 96. It is to be noted that removal of the spring 30 requires only that the nuts 94 and 96 are loosened. Another advantage is that the spring 30 is supported within the housing 50 which is entirely within the cross section of the axle 40.

It is to be understood that the specific construction of the improved through-axle spring installation herein disclosed and described is presented for the purpose of explanation and illustration and is not intended to indicate limits of the invention, the scope of which is defined by the following claim.

What is claimed is:

In a spring suspension system for a wheeled vehicle comprising an axle of substantially uniform cross section defined by vertically spaced top and bottom sections and horizontally spaced vertical sections extending laterally of the vehicle between the wheels thereof and an elongated spring extending between the vehicle and axle for the support of the vehicle relative to the axle, an improved means for securing the spring to the axle comprising a horizontal tubular housing extending transversely of the axle through the vertical sections and between the top and bottom sections thereof and secured thereto, said housing having a convergent-divergent wall section, and means for biasing the spring into fixed engagement with a wall of the housing opposite to the convergent-divergent wall thereof comprising a pair of wedge blocks complementary, respectively, to the convergent-divergent wall section of said housing between the spring and said convergent-divergent wall section, and means for advancing said wedge blocks toward one another to bias the spring against the opposite wall of the housing.

References Cited in the file of this patent
UNITED STATES PATENTS

| | | |
|---|---|---|
| 1,352,488 | Waterhouse | Sept. 14, 1920 |
| 2,312,163 | Hingley | Feb. 23, 1943 |

FOREIGN PATENTS

| | | |
|---|---|---|
| 158,791 | Great Britain | Feb. 17, 1921 |